US008244191B2

(12) United States Patent
Garcia et al.

(10) Patent No.: US 8,244,191 B2
(45) Date of Patent: Aug. 14, 2012

(54) EMERGENCY BUTTON ASSEMBLY FOR A HANDHELD RADIO

(75) Inventors: Jorge L. Garcia, Plantation, FL (US); Anthony M. Kakiel, Coral Springs, FL (US); Adrian F. Rubio, Fort Lauderdale, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 161 days.

(21) Appl. No.: 12/818,914

(22) Filed: Jun. 18, 2010

(65) Prior Publication Data

US 2011/0312289 A1 Dec. 22, 2011

(51) Int. Cl.
*H04B 1/38* (2006.01)

(52) U.S. Cl. ....... 455/90.3; 455/128; 455/518; 455/521; 455/550.1

(58) Field of Classification Search ................. 455/90.1, 455/128, 351, 348, 349, 550.1, 575.1, 518
See application file for complete search history.

(56) References Cited

U.S. PATENT DOCUMENTS

| | | | | |
|---|---|---|---|---|
| 5,146,615 | A * | 9/1992 | Hodsdon et al. | 455/90.3 |
| 5,159,706 | A * | 10/1992 | Hodsdon | 455/90.3 |
| 5,771,448 | A * | 6/1998 | Cooper | 455/411 |
| 6,686,911 | B1 | 2/2004 | Levin et al. | |
| 2004/0032395 | A1 | 2/2004 | Goldberg et al. | |

OTHER PUBLICATIONS

Corresponding International Application No. PCT/US2011/038836—International Search Report with Written Opinion mailed Feb. 9, 2012.

* cited by examiner

*Primary Examiner* — Sanh Phu
(74) *Attorney, Agent, or Firm* — Barbara R. Doutre

(57) ABSTRACT

A push-button assembly for a handheld radio (100) is provided which permits off-axis actuation by a gloved user amongst a crowded radio control environment. The push-button (108) includes first and second guide posts (202, 204) of different length, one guide post also serving as a switch actuator. An alignment guide (206) receives the two guide posts (202, 204). The alignment guide (206) with the first and second guide posts (202, 204) are coupled within a recessed portion (216) of a housing (102) to provide tactile feedback, even during gloved usage. The alignment guide (206) may further provide a light guide (110) which can operate as a third guide post for the radio (100).

15 Claims, 3 Drawing Sheets

EMERGENCY BUTTON ASSEMBLY FOR A HANDHELD RADIO

FIELD OF THE DISCLOSURE

The present disclosure relates generally to handheld two-way radios and more particularly to a control button fitting within a handheld radio's tight space constraints.

BACKGROUND

Handheld two-way radio users are familiar and accustomed to using a variety of controls such as knobs, switches and buttons. Such controls on a radio can include for example volume control, channel selection, and squelch control among others. In certain environments, such as public safety environments, users for example firefighters and rescue personnel are often wearing gloves. Handheld radios developed for use in these conditions often provide a wider diameter rotary control—considered to be a more "glovable" control. However, inadvertent or unintentional actuation can become problematic with larger diameter, glovable controls. Consequently, designers attempt to provide large controls for gloved users. However, trying to provide a large button tightly located between other radio controls can be problematic. The issues of actuation, dust and binding are all concerns. For controls such as an emergency control, the users need to be able to easily access the control.

Accordingly, there is a need for an improved control button on a handheld radio, particularly a control that can be easily actuated by a gloved user.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
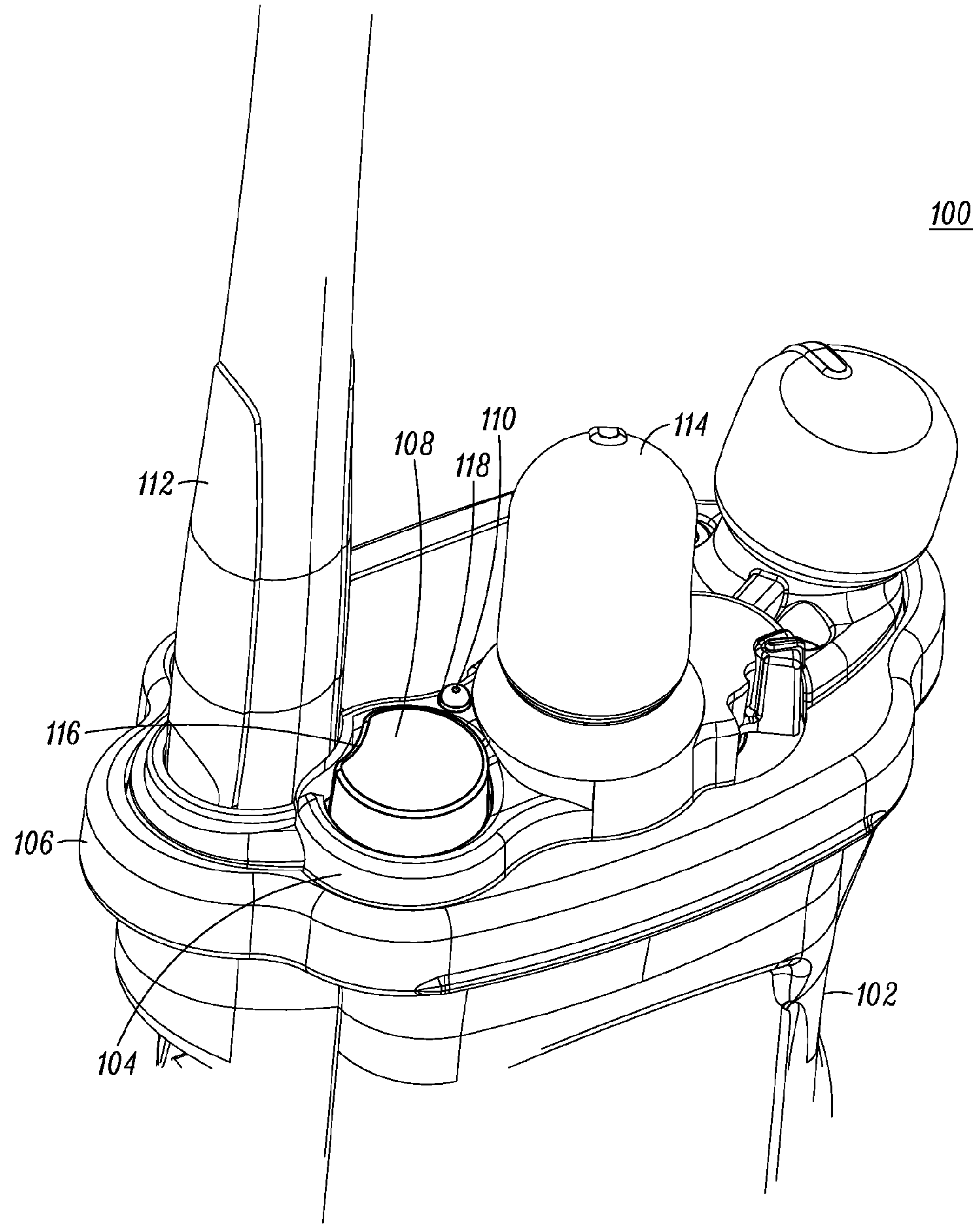
FIG. 1 illustrates a handheld radio having an emergency push-button and light formed in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein an assembly for a push-button control and light guide for a handheld radio. The assembly utilizes a combination of elements including a housing having a top portion formed of top and bottom integrally molded bezels with apertures within which the push-button control and light guide are received. The push-button control is suitably large enough for gloved use and space efficiency is maximized by the positioning the push-button control along the back of the radio in between an antenna and channel control knob.

FIG. 1 is a perspective partial view of a two-way handheld radio 100 having an emergency push-button control in accordance with an embodiment of the invention. Handheld radio 100 is formed of a housing 102 having a top housing portion including a plurality of radio elements comprising at least an antenna 112 and a frequency control knob 114. A push-button, preferably operating as a push-button emergency switch control, 108 is situated on the top housing portion between the antenna 112 and the frequency control knob 114 thereby allowing off-axis actuation of the push-button control. A light guide 110 indicating transmit mode is proximately located to the push-button 108 through light guide aperture 118. The push-button has a cut-away portion 116 for maximizing the size of the button while accommodating the contour on the antenna 112.

The main housing's top housing portion is formed first and second bezels, shown here as a top bezel 104 and a bottom bezel 106 respectively. The push-button 108 and light guide 110, combine as a sub-assembly to be described herein, are mounted to the top bezel 104 in between an antenna 112 and a frequency control knob 114. Other radio elements, such as a display, push-to-talk (PTT) button, and additional top mounted controls are also shown, but not described, to illustrate the generally crowded radio control environment in which the push-button control 108 needs to operate. The handheld radio 100 provides increased accessibility to push-button 108 by locating the button near the back of the radio.

Figure 2:
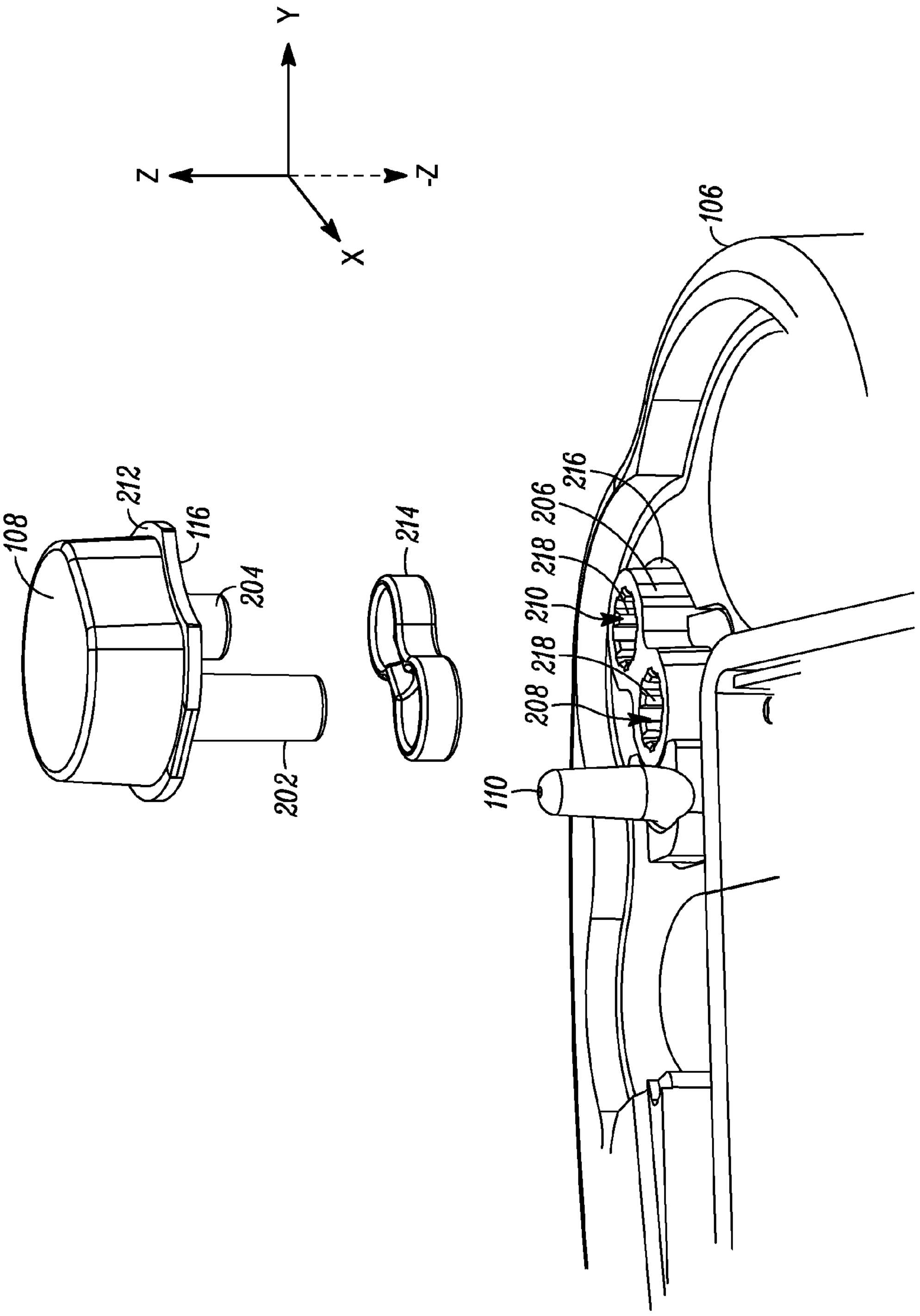
FIG. 2 is an exploded view of the push-button control and light guide of FIG. 1 in accordance with an embodiment of the invention.

FIG. 2 is a partially exploded view of the push-button control and light guide assembly in accordance with an embodiment of the invention. Push-button 108 includes first and second guide posts 202, 204 extending therefrom. First guide post 202 is substantially longer than second guide post 204. An alignment guide 206 is an integrally molded piece part preferably formed of a rigid plastic. The alignment guide 206 includes first and second guide holes 208, 210 for receiving the first and second guide posts 202, 204 respectively. In accordance with an embodiment, the light guide 110 also makes up a portion of the alignment guide 206. The push-button 108 includes a shelf portion 212 formed about its base. A force adder element 214 is provided to mount to guide posts 202, 204 and provide compressible and expandable coupling between the push-button 108 and the alignment guide 206. The alignment guide 206 is coupled within recessed portion 216 of the bottom bezel 106. Bottom bezel 106 is formed of a metal material, such as aluminum to provide a substantially rigid housing portion. The recessed portions and apertures include electronics, such as switches, printed circuit boards and flex circuits to interface with the controls located on the top of the radio 100.

In accordance with an embodiment, the alignment guide 206 includes a plurality of rails 218 within the guide holes 208, 210 for additional retention of the first and second guide posts 202, 204. The rails 218 advantageously minimize binding by preventing dust particles from settling between the guide posts 202, 204 and their respective guide holes 208, 210. The first guide post 202 is insertable into the first guide hole 208 to provide switch actuation (shown in FIG. 3) as well as vertical (z-axis) alignment within the first guide hole. The second guide post 204 is insertable within the second guide hole 210 of the alignment guide 206 to provides rotation lock which eliminates movement of the push-button 108 across a horizontal (x/y) plane. The alignment guide 206 is a unitarily formed piece part which, in addition to providing the first and second guide holes 208, 210 utilizes the light guide 110 as an additional, third, guide post. Hence, light guide 110, not only provides a light guide for the handheld radio 100 but also provides a third alignment post (for aligning through the light guide aperture 118 in the top bezel 104, as shown back in FIG. 1).

Figure 3:
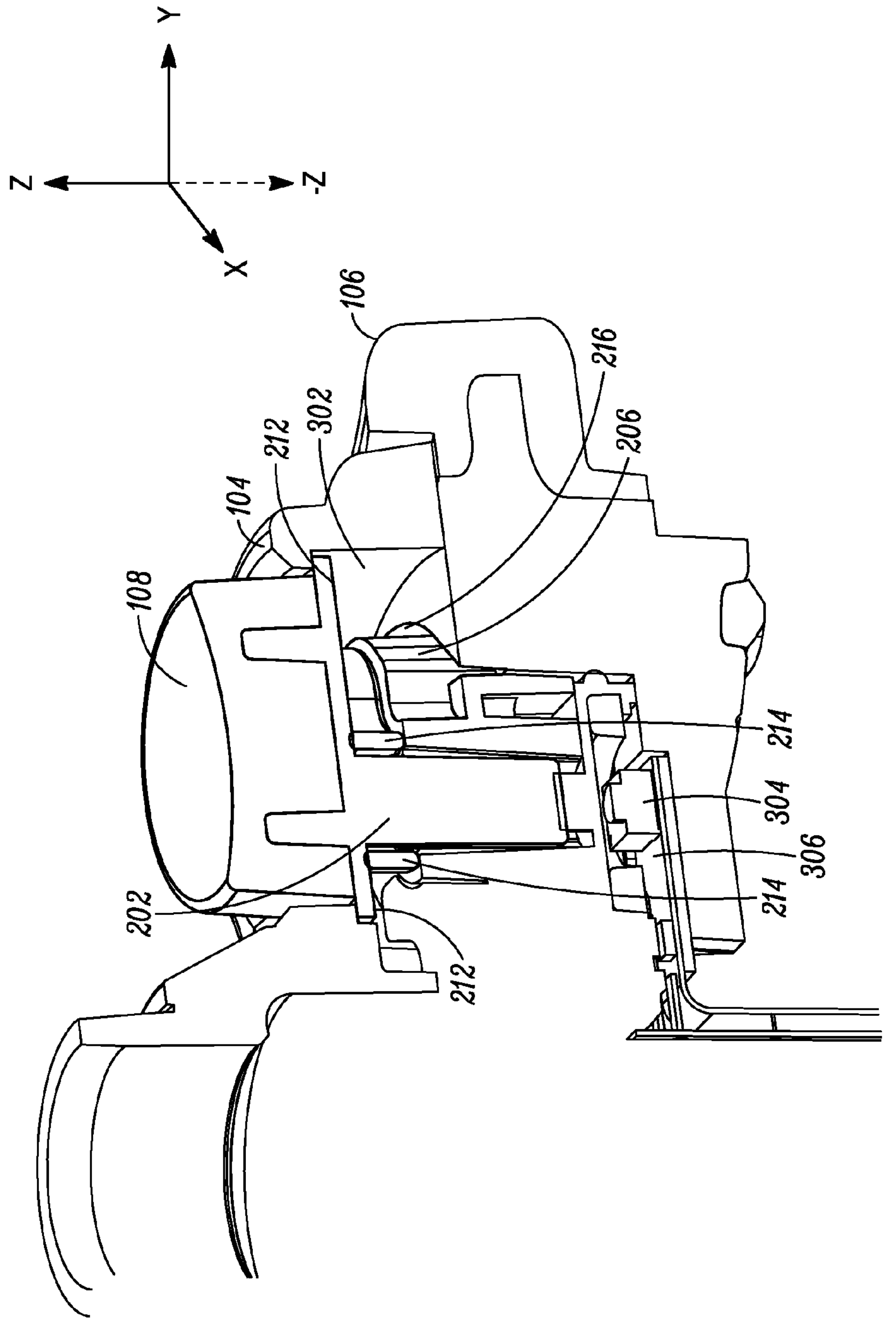
FIG. 3 is a cutaway view of the handheld radio with emergency push-button of FIG. 1 in accordance with an embodiment of the invention.

FIG. 3 is a cutaway view of the assembled handheld radio 100 of FIG. 1. Top bezel 104 includes a recessed portion 302. The recessed portion 302 of top bezel 104 and recessed portion 216 of bottom bezel 106 receive and retain the push-button/light guide assembly. The alignment guide 206 is seated within recessed portion 216 of the bottom bezel 106. The recessed portion 216 of bottom bezel 106 provides access to a switch 304 located on a printed circuit board (PCB) 306. The shelf portion 212 abuts a perimeter of the recessed portion 302 against the top bezel 104. The shelf portion 212 of the push-button 108 and force adder element 214 coupled beneath the shelf about the first and second guide posts 202, 204 and resting upon the alignment guide 206 limit the vertical movement of the push-button 108. The force adder element 214 provides limits the amount of travel of the push-button in the vertical (+/−z-axis) direction. As the push button is pressed downward the first guide post 202 makes contact with switch 304. During an emergency button press, pressing the push-button 108 will result in light guide 110 being illuminated.

Accordingly, there has been provided a push-button control assembly for a handheld radio that can be easily located and accessed amongst various other user control elements located on the radio. The incorporation of the light guide operating as an additional guide post within the push-button assembly facilitates the manufacturing assembly as fewer piece parts need to be assembled. The plurality of integrally molded recessed portions formed within the housing in conjunction with the integrally formed modular piece parts also facilitate alignment during assembly. The push-button is easily accessible from a back side of the handheld radio for off-axis actuation facilitating gloved usage, even amongst a crowded radio control environment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A push-button control assembly for a handheld radio, comprising:

a housing having a recessed portion;

a push-button being mounted within the recessed portion of the housing, the push-button having first and second guide posts extending therefrom, the first guide post also serving as a switch actuator; and an alignment guide having first and second guide holes for receiving the first and second guide posts within the housing, and wherein the first and second guide posts, the recessed portion of the housing, and the alignment guide are operatively coupled to provide tactile feedback during gloved usage.

2. The push-button control assembly of claim 1, wherein the push-button further comprises a cut-away portion for maximizing the size of the push-button while accommodating a contour of an antenna mounted to the handheld radio.

3. The push-button control assembly of claim 2, wherein the push-button is situated between the antenna and a frequency control knob, and wherein the push-button provides an emergency switch control.

4. The push-button control assembly of claim 1, further comprising:

a light guide aperture formed on the housing; and the alignment guide also comprising a light guide integrally formed therein, the light guide providing both a light guide for the radio and a third guide post for aligning within the light guide aperture of the housing.

5. A handheld radio, comprising:

a housing having a top housing portion including a plurality of radio elements comprising at least an antenna and a frequency control knob;

a push-button emergency control situated on the top housing portion between the antenna and the frequency control knob, the push-button emergency control being accessible from a back side of the handheld radio for off-axis actuation, wherein the push-button emergency control further comprises a cut-away portion for maximizing the size of the push-button emergency control while accommodating a contour of the antenna.

6. The handheld radio of claim 5, wherein the push-button emergency control further comprises a shelf portion for abutting the push-button emergency control against the top portion of the housing.

7. The handheld radio of claim 5, further comprising:

an alignment guide having first and second guide holes; and wherein the push-button emergency control further comprises first and second guide posts, the first guide post providing actuation to a switch and vertical (z-axis) alignment within the first guide hole of the alignment guide, and the second guide post providing rotation lock of the push-button emergency control within the second guide hole of the alignment guide.

8. The handheld radio of claim 7, further comprising:

a light guide aperture formed on the top housing portion; and a light guide integrally molded as part of the alignment guide, the light guide providing a third alignment post for aligning through the light guide aperture of the housing.

9. The handheld radio of claim 8, wherein the alignment guide having first and second guide holes further comprises a plurality of rails coupled within the guide holes.

10. The handheld radio of claim 9, further comprising:

a shelf portion coupled to the push-button emergency control; and a force adder element coupled about the first and second guide holes and compressibly coupled between the alignment guide and the shelf portion of the push-button emergency control to limit vertical movement of the push-button emergency control.

11. An assembly for a push-button control, comprising:

a housing having a plurality of integrally molded recessed portions;

a push-button control with guide posts extending therefrom, the push-button control being coupled within the recessed portions of the housing; and an alignment guide coupled within the housing, the alignment guide having guide holes for receiving the guide posts; and a force adder element coupled about the guide posts between the alignment guide and the push-button control, one of the guide posts also operating as a switch actuator.

12. The assembly of claim 11, wherein the guide posts comprises first and second guide posts of different lengths.

13. The assembly of claim 12, wherein the alignment guide includes a plurality of rails within the guide holes.

14. The assembly of claim 13, wherein the housing further comprises:

top and bottom bezels coupled together and within which are formed the recessed portions; and the alignment guide being mounted within a recessed portion of the bottom bezel.

15. The assembly of claim 14, further comprising:

a light guide aperture formed in the top bezel; and the alignment guide having an integrally molded light guide formed therein, the integrally molded light guide operating as both a light guide and an additional guide post for aligning the assembly within the light guide aperture.

* * * * *